UNITED STATES PATENT OFFICE.

ROGER WILLIAMS, OF PROVIDENCE, RHODE ISLAND, ASSIGNOR TO NITROGEN PRODUCTS COMPANY, OF PROVIDENCE, RHODE ISLAND, A CORPORATION OF RHODE ISLAND.

PROCESS OF PRODUCING ALKALI-METAL FERRICYANIDS AND THE LIKE.

1,328,938. Specification of Letters Patent. Patented Jan. 27, 1920.

No Drawing. Application filed March 16, 1918. Serial No. 222,878.

*To all whom it may concern:*

Be it known that I, ROGER WILLIAMS, a citizen of the United States, residing at Providence, in the county of Providence and State of Rhode Island, have invented certain new and useful Improvements in Processes of Producing Alkali-Metal Ferricyanids and the like, of which the following is a specification.

This invention relates to the production of stable cyanids the bases of which are in part at least composed of heavy metals,—and more especially to the production of complex cyanids which include an alkali or alkaline-earth metal and a metal of the iron group and which are soluble in water, or, as hereinafter expressed, are water-soluble. In its more limited aspect my invention concerns the manufacture of pure or very nearly pure sodium ferricyanid, a substance the demand for which is growing and the production of which by known methods, has heretofore not been wholly satisfactory; the cost of producing this material in pure condition and, desirably, in the form of large crystals, being unduly high.

One of the objects of the present invention, therefore, is to reduce the cost of manufacture of this and like materials; my product, in the case of said sodium ferricyanid being in the form of beautiful large ruby red crystals in contradistinction to the rather muddy brown, small crystals of this material now commercially obtainable.

A number of methods have been devised for converting the yellow prussiate of potassium,—K$_4$Fe″(CN)$_6$,— to potassium ferricyanid; most of these involving the use of so called oxidation agents. Thus: Chlorin gas is caused to act on potassium ferrocyanid with production of ferricyanid of potassium and potassium chlorid.

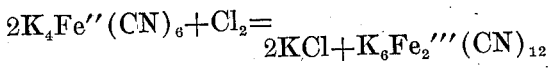

2K$_4$Fe″(CN)$_6$+Cl$_2$=
2KCl+K$_6$Fe$_2$‴(CN)$_{12}$

This treatment may be effected in the dry or in the moist way; the latter being preferred. Now, although this is the oldest process of this character, and, moreover, one which is still in use, it is one which is quite difficult to conduct and requires great care and attention. If too much chlorin is used there is formed a very finely divided green precipitate of complex composition which tends to prevent crystallization of the ferricyanid. Also, in spite of its insolubility, this precipitate is most difficult to separate on filtration, as it passes through the filters. On the other hand, if too little chlorin be used, the product contains non-decomposed ferrocyanid.

After the treatment with chlorin has been stopped, the solution is filtered and concentrated by boiling, to drive off a considerable part of the water initially used to dissolve the ferrocyanid, and thereafter the liquor is allowed to stand for days, preferably in wooden vats, until the ferricyanid crystals form. The crystals are then separated from the mother-liquor by decantation and said liquor, now quite concentrated with respect to the chlorid, is then further used in the process. It soon becomes worthless, however, as regards making anywhere near pure ferricyanid, and must be evaporated to dryness; the resulting mixture of salt and ferricyanid being sold as such.

This process is necessarily rather slow and when it is attempted to apply it to the production of sodium ferricyanid, rather than ferricyanid of potassium, further difficulties present themselves, due to the fact that sodium ferricyanid is so much more soluble than the common salt produced in lieu of the potassium chlorid aforesaid; so that when the solution has been sufficiently concentrated to cause the ferricyanid to crystallize out on cooling, said salt (though present in much smaller amount than the ferricyanid) begins to deposit also. Thus, in spite of the fact that the demand today is primarily for the ferricyanid of sodium rather than that of potassium, the sodium product is, to the best of my knowledge, not produced commercially by the halogen oxidizing treatment aforesaid.

As additionally emphasizing the importance of the novel combination of steps which constitutes my improved process it should be further observed that when using sodium ferrocyanid instead of potassium ferrocyanid, where chlorin is employed as the oxidizing medium, somewhat less care need be exercised in the treatment; but on the other hand, as above mentioned, the difficulty of separating the sodium ferricyanid thus produced, from the other reaction products (otherwise than as herein prescribed)

is greatly increased. I may here state also that when my improved process is operated in the dry way, the chlorin is caused to act upon the powdered ferrocyanid, which is preferably disposed in thin layers in chambers like those used in the manufacture of chlorid of lime, or in revolving apparatus,—substantially in the same fashion as the oxidation in the dry way of potassium ferrocyanid, to the ferricyanid, has heretofore been conducted, in so far as the initial formation of the ferricyanid in the mass is concerned; the essential and novel difference,—as in my improved mode of effectuating the process in the moist way,—particularly concerning the improved separation of the ferricyanid in pure condition from the other reaction products or ingredients of said mass, while at the same time facilitating its initial production (prior to such separation) by largely eliminating the necessity for extreme care in the handling of the halogenous oxidizing reagent.

I am aware that it was proposed as far back as 1869 to substitute bromin for chlorin, in the known process, and I desire not to be limited to the particular halogen, chlorin, in my improved process; although chlorin is much to be preferred, for one reason, on account of its cheapness as compared to bromin,—cost of production of the desired product being an essential factor in determining the commercial success or non-success of the process.

Returning therefore to the preferred method of forming sodium ferricyanid, which best exemplifies my invention, it is to be recognized that particularly in the case of this product very considerable difficulty is encountered in effecting its separation from the remaining reaction products, in pure condition, when the known methods of effecting such separation are employed.

If, however, as I have discovered, the mass containing the ferricyanid be evaporated to dryness,—if produced in the moist way, or be directly treated as hereinafter described, if produced in the dry way,—then the desired separation can be performed with ease and at very low cost.

Assuming that, as per the preferred form of the process, a solution of sodium ferrocyanid in water has been treated with chlorin to effect the following reaction:

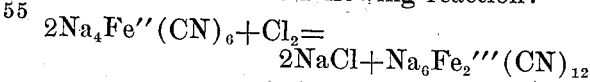

and that the water in which the ferrocyanid was dissolved has been driven off by gentle heat; there then remains an intimate mixture of common salt and sodium ferricyanid, and both of these substances are extremely soluble in water. Peculiarly, however, while alkali metal cyanids are extremely soluble in liquid ammonia, the stable complex cyanids are not. On the other hand, halogen compounds, such as KBr, NaCl, etc., are exceedingly soluble in anhydrous liquid ammonia.

When, therefore, the aforesaid dry mixture is leached with liquid ammonia,—preferably, of course, in an air tight receptacle, with provisions for evaporating off the extracting solvent and recovering the same subsequently again in liquid form for further use in the process,—the sodium chlorid, or the like, is substantially completely removed.

Thus, the desired ferricyanid is left in pure condition, and, if desired, it may then be dissolved in just sufficient water to form a highly concentrated solution, from which large, beautiful crystals of red prussiate can be obtained. To favor the production of particularly large crystals, some additional water may be gently poured upon the top of the concentrated solution, which when left standing for a time will deposit out the product upon the sides of the preferably wooden receptacle.

The continued production of large crystals may be favored and expedited by decantation of the liquid after the crystals have been copiously produced; and then concentrating the mother liquor by evaporating off a part of the water, to repeat the step of depositing out crystals by again placing a layer of water on the surface of the again highly concentrated solution; etc.;—or concentrating said mother liquor by adding fresh product (from the extracting operation) in lieu of evaporating;—or both.

The solution of common salt in the liquid ammonia is then, preferably, subjected to gentle heat, to speedily vaporize all of the ammonia; such heating being especially desirable when working with large masses, in order to economize time and prevent waste of ammonia.

The volatilized ammonia is then converted to the liquid phase by cooling and pressure in a known fashion for return to the process; and care should preferably be exercised during the various operations to prevent, as far as practicable, access of atmospheric air to the mixture to be leached by this solvent; the ferricyanid being highly deliquescent, and where moisture can thus be obtained from the atmosphere, it speedily accumulates in the ammonia system and deleteriously affects the purity of the salt produced, while causing loss of the water-soluble ferricyanid.

The salt obtained, whether common salt or otherwise, is normally in particularly pure and marketable condition; so that there are no waste products from the process.

In the appended claims the term "heavy metal" is used in what is, I believe, its commonly accepted sense in the branch of chemistry to which the present application relates, namely, any of those metals which are capable of acting as the base, or part of the base, of a stable cyanogen compound and which do not belong to the alkali or alkaline earth groups of metals; these latter, for convenience, being in contradistinction, frequently referred to as "light metals."

I particularly desire to direct attention to the fact that, to the best of my knowledge, there is now made practicable for the first time, the use of such an oxidation process as that employing chlorin as the reagent for the manufacture of sodium ferricyanid; since where it might be attempted to so form this product,—as herein before mentioned,—its solubility (as related to its concentration) in the recognized solvent, water, would then be substantially the same as that of the salt coincidently produced, which would render resort to some further converting treatment necessary, with consequent increase in cost of manufacture of said product. Further, liquid ammonia is truly an extracting agent, whereas, I believe, no solvent hitherto used in connection with any oxidizing operation of the character in question, could properly be so characterized.

Finally, I have also discovered that when my preferred solvent is thus used, even where other alkaline ferricyanids than that of sodium are thus produced, the necessity for extreme care in handling the preferred oxidizing reagent, chlorin, is largely eliminated, since sufficient chlorin, for example, may be supplied to the ferrocyanid to completely convert the latter to ferricyanid, and if some Berlin green, or like product is formed, this precipitate may be allowed to settle to the bottom of the mixture to be treated, where it will be found when the water of solution is evaporated off; provided that said water be not allowed to boil from the bottom of the receptacle—the heat being applied rather to the upper parts of the liquid mass to prevent ascending bubbles carrying the undesirable precipitate up through said mass.

When, therefore, the mixture has been evaporated to dryness, the Berlin green or the like will be found at the bottom, and,— being substantially insoluble in liquid ammonia,—will still be found at the bottom after the leaching operation. It may then be mechanically separated from the solid ferricyanid, with but little loss of the latter.

Having thus described my invention, what I claim is:

1. The process of obtaining a water-soluble cyanid the base of which is in part at least composed of a heavy metal, which comprises converting a water-soluble cyanogen compound into said cyanid with formation, together with the product sought, of a water-soluble salt, said product and salt being intimately commingled, winning said product in solid form from the mixture of reaction products by extracting the salt from said mixture with an extracting agent which is substantially free from water and which is incapable of dissolving or entering into chemical combination with said cyanid at the temperature of the extracting operation, and separating said salt from said agent by heat treatment.

2. The process of obtaining a water-soluble cyanid the base of which is in part at least composed of a heavy metal, which comprises converting a water-soluble cyanogen compound into said cyanid with formation, together with the product sought, of a water-soluble salt, said product and salt being intimately commingled, winning said product in solid form from the mixture of reaction products by extracting the salt from said mixture with an extracting agent which is incapable of dissolving or entering into chemical combination with said cyanid at the temperature of the extracting operation, and separating said salt from said agent by heat treatment.

3. The process of obtaining a water-soluble cyanid the base of which includes a light metal and a heavy metal, which comprises reacting upon a cyanogen compound with a halogenous reagent to form the product sought and a halogen salt, said product and salt being intimately commingled, winning said product in solid form from the mixture of reaction products by extracting the salt from said mixture with an extracting agent which is incapable of dissolving or entering into chemical combination with said cyanid at the temperature of the extracting operation, and separating said salt from said agent by heat treatment.

4. The process of obtaining a complex cyanid the base of which includes an alkali metal and a metal of the iron group which comprises producing said cyanid through the intermediacy of a reagent which is capable of converting the ferrocyanid of said alkali metal to the ferricyanid of the same, by reacting with said reagent upon a cyanid whose base includes both said alkali metal and said metal of the iron group but in different proportions from those of the product sought, the valency of said metal of the iron group being higher in the latter than in the former, said reaction also yielding a salt which includes said reagent, and extracting said salt from the reaction products while leaving the product sought in solid condition.

5. The process of obtaining an alkali metal ferricyanid which comprises reacting upon an alkali metal ferrocyanid with a reagent having a strong chemical affinity for alkali metals, to form said ferricyanid and a salt which includes a part of the alkali metal originally present in said ferrocyanid, extracting said salt from the reaction products to leave said alkali metal ferricyanid in solid condition, dissolving said ferricyanid in a solvent therefor, and obtaining it from the so formed solution in crystalline condition.

6. The process of obtaining sodium ferricyanid which comprises reacting upon sodium ferrocyanid with a reagent having a strong chemical affinity for alkali metals to form said ferricyanid and a salt which includes a part of the sodium originally present in said ferrocyanid, extracting said salt from the reaction products to leave said sodium ferricyanid in solid condition, dissolving said ferricyanid in a solvent therefor, and obtaining it from the so formed solution in crystalline condition.

7. The process of obtaining sodium ferricyanid which comprises reacting with chlorin upon sodium ferrocyanid to form said ferricyanid and common salt, extracting said salt from the reaction products to leave said ferricyanid in solid condition, dissolving said ferricyanid in water, and obtaining it from the so formed solution in crystalline form.

8. The process of obtaining an alkali metal ferricyanid which comprises, forming said ferricyanid by reacting an alkali metal ferrocyanid with a halogenous reagent which when used in excess, forms a substance which is difficultly separable from said ferricyanid by filtration, said reaction also forming a halogen salt of said alkali metal, and separating said halogen salt both from said ferricyanid and said substance, when the latter is present, by dissolving said salt in liquid ammonia.

9. The process of obtaining an alkali metal ferricyanid which comprises, forming said ferricyanid by reacting an alkali metal ferrocyanid with a halogenous reagent which when used in excess, forms a substance which is difficultly separable from said ferricyanid by filtration, said reaction also forming a halogen salt of said alkali metal, separating said halogen salt both from said ferricyanid and said substance, when the latter is present, by dissolving said halogen salt in a volatilizable extracting agent in which both said substance and said ferricyanid are substantially insoluble, separating said salt from said extracting agent by heat treatment, and separating said substance, when present, from the bulk of said ferricyanid while said ferricyanid is in solid form.

In testimony whereof I have affixed my signature in the presence of two witnesses.

ROGER WILLIAMS.

Witnesses:
J. M. ARCHER,
FLOYD N. WATSON.